US012732863B2

(12) United States Patent
Paz et al.

(10) Patent No.: US 12,732,863 B2
(45) Date of Patent: Sep. 8, 2026

(54) SEMI-PERSISTENT SCHEDULING AND COMPRESSION ADAPTATION

(71) Applicant: QUALCOMM Incorporated, San Diego, CA (US)

(72) Inventors: Daniel Paz, Atlit (IL); Michael Levitsky, Rehovot (IL); Matan Guetta, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 18/297,300

(22) Filed: Apr. 7, 2023

(65) Prior Publication Data

US 2024/0340695 A1 Oct. 10, 2024

(51) Int. Cl.

| | |
|---|---|
| ***H04W 28/06*** | (2009.01) |
| ***H04W 24/08*** | (2009.01) |
| ***H04W 72/11*** | (2023.01) |
| ***H04W 72/50*** | (2023.01) |

(52) U.S. Cl.

CPC ........... *H04W 28/06* (2013.01); *H04W 24/08* (2013.01); *H04W 72/11* (2023.01); *H04W 72/50* (2023.01)

(58) Field of Classification Search

CPC ..... H04W 28/06; H04W 24/08; H04W 72/11; H04W 72/50; H03M 7/607; H04L 1/0014; H04L 5/006; H04L 69/04

See application file for complete search history.

(56) References Cited

U.S. PATENT DOCUMENTS

| | | | | |
|---|---|---|---|---|
| 6,091,777 | A * | 7/2000 | Guetz | H04N 19/635 375/240.03 |
| 2015/0049678 | A1 | 2/2015 | Speight et al. | |
| 2015/0072667 | A1* | 3/2015 | Hu | H04W 8/183 455/418 |
| 2019/0068473 | A1* | 2/2019 | Vu | H04L 41/147 |
| 2019/0182308 | A1 | 6/2019 | Vu et al. | |
| 2019/0313281 | A1* | 10/2019 | Bencheikh | H04W 28/06 |

(Continued)

FOREIGN PATENT DOCUMENTS

| | | |
|---|---|---|
| CN | 114666914 A | 6/2022 |

OTHER PUBLICATIONS

International Search Report and Written Opinion—PCT/US2024/022295—ISA/EPO—Jun. 24, 2024 (2301693WO).

*Primary Examiner* — Mandish K Randhawa

(74) *Attorney, Agent, or Firm* — QUALCOMM Incorporated

(57) ABSTRACT

Methods, systems, and devices for wireless communications are described. In some cases, a user equipment (UE) may transmit a control message indicating semi-persistent (SP) resources for multiple wireless devices scheduling within a set of resource reservation periods. The UE may measure one or more channel conditions of a channel during a first resource reservation period of the set of resource reservation periods, the channel associated with the SP resources for the multiple wireless devices. Additionally, the UE may adapt a compression parameter of one or more signals to be transmitted to the multiple wireless devices during the first resource reservation period based on the one or more channel conditions and may transmit, to the multiple wireless devices, one or more compressed signals generated based on the compression parameter and the one or more signals.

30 Claims, 11 Drawing Sheets

(56) References Cited

U.S. PATENT DOCUMENTS

| | | | | |
|---|---|---|---|---|
| 2020/0028603 | A1* | 1/2020 | Wang | H04L 5/0057 |
| 2021/0037420 | A1* | 2/2021 | Gulati | H04W 24/08 |
| 2022/0015109 | A1* | 1/2022 | Fong | H04W 76/11 |
| 2022/0150733 | A1 | 5/2022 | Aktas et al. | |
| 2022/0394076 | A1* | 12/2022 | Willars | H04W 28/06 |
| 2024/0323757 | A1* | 9/2024 | Kobayashi | H04W 28/0231 |

* cited by examiner

200

500

700

SEMI-PERSISTENT SCHEDULING AND COMPRESSION ADAPTATION

FIELD OF TECHNOLOGY

The following relates to wireless communications, including semi-persistent scheduling and compression adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support semi-persistent scheduling (SPS) and compression adaptation. Generally, the techniques described herein may enable a user equipment (UE) to adapt a compression parameter of one or more signals to be transmitted to multiple wireless devices during an SPS period. For example, the UE may transmit a control message indicating SP resources for the multiple wireless devices scheduled within a set of SPS periods (e.g., resource reservation periods). Additionally, the UE may measure one or more channel conditions of a channel during a first SPS period of the set of SPS periods, where the channel is associated with the SP resources. As such, the UE may adapt a compression parameter of one or more signals to be transmitted to the multiple wireless devices during the first SPS period based on the one or more channel conditions. For example, the UE may increase the compression parameter based on a decrease in a channel capacity, a decrease in a spectral efficiency, or both. Alternatively, the UE may decrease the compression parameter based on an increase in the channel capacity, an increase in the spectral efficiency, or both. Accordingly, the UE may transmit, to the multiple wireless devices, one or more compressed signals generated based on the compression parameter and the one or more signals.

A method for wireless communications at a UE is described. The method may include transmitting a control message that indicates SP resources for a set of multiple wireless devices scheduled within a set of resource reservation periods, measuring one or more channel conditions of a channel during a first resource reservation period of the set of resource reservation periods, the channel associated with the SP resources for the set of multiple wireless devices, adapting a compression parameter of one or more signals to be transmitted to the set of multiple wireless devices during the first resource reservation period based on the one or more channel conditions, and transmitting, to the set of multiple wireless devices, one or more compressed signals generated based on the compression parameter and the one or more signals.

An apparatus for wireless communications at a UE is described. The apparatus may include a processor, memory coupled with the processor, and instructions stored in the memory. The instructions may be executable by the processor to cause the apparatus to transmit a control message that indicates SP resources for a set of multiple wireless devices scheduled within a set of resource reservation periods, measure one or more channel conditions of a channel during a first resource reservation period of the set of resource reservation periods, the channel associated with the SP resources for the set of multiple wireless devices, adapt a compression parameter of one or more signals to be transmitted to the set of multiple wireless devices during the first resource reservation period based on the one or more channel conditions, and transmit, to the set of multiple wireless devices, one or more compressed signals generated based on the compression parameter and the one or more signals.

Another apparatus for wireless communications at a UE is described. The apparatus may include means for transmitting a control message that indicates SP resources for a set of multiple wireless devices scheduled within a set of resource reservation periods, means for measuring one or more channel conditions of a channel during a first resource reservation period of the set of resource reservation periods, the channel associated with the SP resources for the set of multiple wireless devices, means for adapting a compression parameter of one or more signals to be transmitted to the set of multiple wireless devices during the first resource reservation period based on the one or more channel conditions, and means for transmitting, to the set of multiple wireless devices, one or more compressed signals generated based on the compression parameter and the one or more signals.

A non-transitory computer-readable medium storing code for wireless communications at a UE is described. The code may include instructions executable by a processor to transmit a control message that indicates SP resources for a set of multiple wireless devices scheduled within a set of resource reservation periods, measure one or more channel conditions of a channel during a first resource reservation period of the set of resource reservation periods, the channel associated with the SP resources for the set of multiple wireless devices, adapt a compression parameter of one or more signals to be transmitted to the set of multiple wireless devices during the first resource reservation period based on the one or more channel conditions, and transmit, to the set of multiple wireless devices, one or more compressed signals generated based on the compression parameter and the one or more signals.

In some examples of the method, apparatuses, and non-transitory computer-readable medium described herein, adapting the compression parameter may include operations, features, means, or instructions for increasing the compression parameter based on a decrease in a channel capacity, a decrease in a spectral efficiency, or both.

In some examples of the method, apparatuses, and non-transitory computer-readable medium described herein, adapting the compression parameter may include operations, features, means, or instructions for decreasing the compression parameter based on an increase in a channel capacity, an increase in a spectral efficiency, or both.

In some examples of the method, apparatuses, and non-transitory computer-readable medium described herein, the one or more channel conditions may be based on a channel capacity of the channel, a spectral efficiency associated with the channel, or both.

Some examples of the method, apparatuses, and non-transitory computer-readable medium described herein may further include operations, features, means, or instructions for generating the one or more compressed signals according to a frame rate associated with each wireless device of the set of multiple wireless devices, where each frame rate may be based on the compression parameter.

In some examples of the method, apparatuses, and non-transitory computer-readable medium described herein, the frame rate associated with each wireless device may be based on a distortion level associated with generation of the one or more compressed signals, a bit rate associated with generation of a subset of the one or more compressed signals associated with a respective wireless device, or both.

In some examples of the method, apparatuses, and non-transitory computer-readable medium described herein, generating the one or more compressed signals may include operations, features, means, or instructions for decreasing a bit rate associated with each wireless device of the set of multiple wireless devices based on increasing the compression parameter.

In some examples of the method, apparatuses, and non-transitory computer-readable medium described herein, generating the one or more compressed signals may include operations, features, means, or instructions for increasing a bit rate associated with each wireless device of the set of multiple wireless devices based on decreasing the compression parameter.

In some examples of the method, apparatuses, and non-transitory computer-readable medium described herein, generating the one or more compressed signals may include operations, features, means, or instructions for generating a first subset of the one or more compressed signals according to a first frame rate, where the first frame rate may be associated with a first wireless device of the set of multiple wireless devices, and where the UE transmits the first subset of the one or more compressed signals to the first wireless device.

In some examples of the method, apparatuses, and non-transitory computer-readable medium described herein, generating the one or more compressed signals may include operations, features, means, or instructions for generating a second subset of the one or more compressed signals according to a second frame rate, where the second frame rate may be associated with a second wireless device of the set of multiple wireless devices, and where the UE transmits the second subset of the one or more compressed signals to the second wireless device.

In some examples of the method, apparatuses, and non-transitory computer-readable medium described herein, each wireless device of the set of multiple wireless devices may be associated with a frame rate.

In some examples of the method, apparatuses, and non-transitory computer-readable medium described herein, one or more wireless devices of the set of multiple wireless devices may be associated with a same frame rate.

In some examples of the method, apparatuses, and non-transitory computer-readable medium described herein, one or more wireless devices of the set of multiple wireless devices may be associated with different frame rates.

In some examples of the method, apparatuses, and non-transitory computer-readable medium described herein, measuring the one or more channel conditions may include operations, features, means, or instructions for measuring one or more reference signals received via the channel during the first resource reservation period, where the one or more channel conditions may be based on the one or more reference signals.

In some examples of the method, apparatuses, and non-transitory computer-readable medium described herein, the one or more reference signals may be measured via a physical layer at the UE.

In some examples of the method, apparatuses, and non-transitory computer-readable medium described herein, the compression parameter may be adapted over a duration of a single frame.

In some examples of the method, apparatuses, and non-transitory computer-readable medium described herein, the compression parameter may be adapted via an application layer of the UE and the one or more compressed signals may be transmitted via a physical layer of the UE.

DETAILED DESCRIPTION

Figure 1:
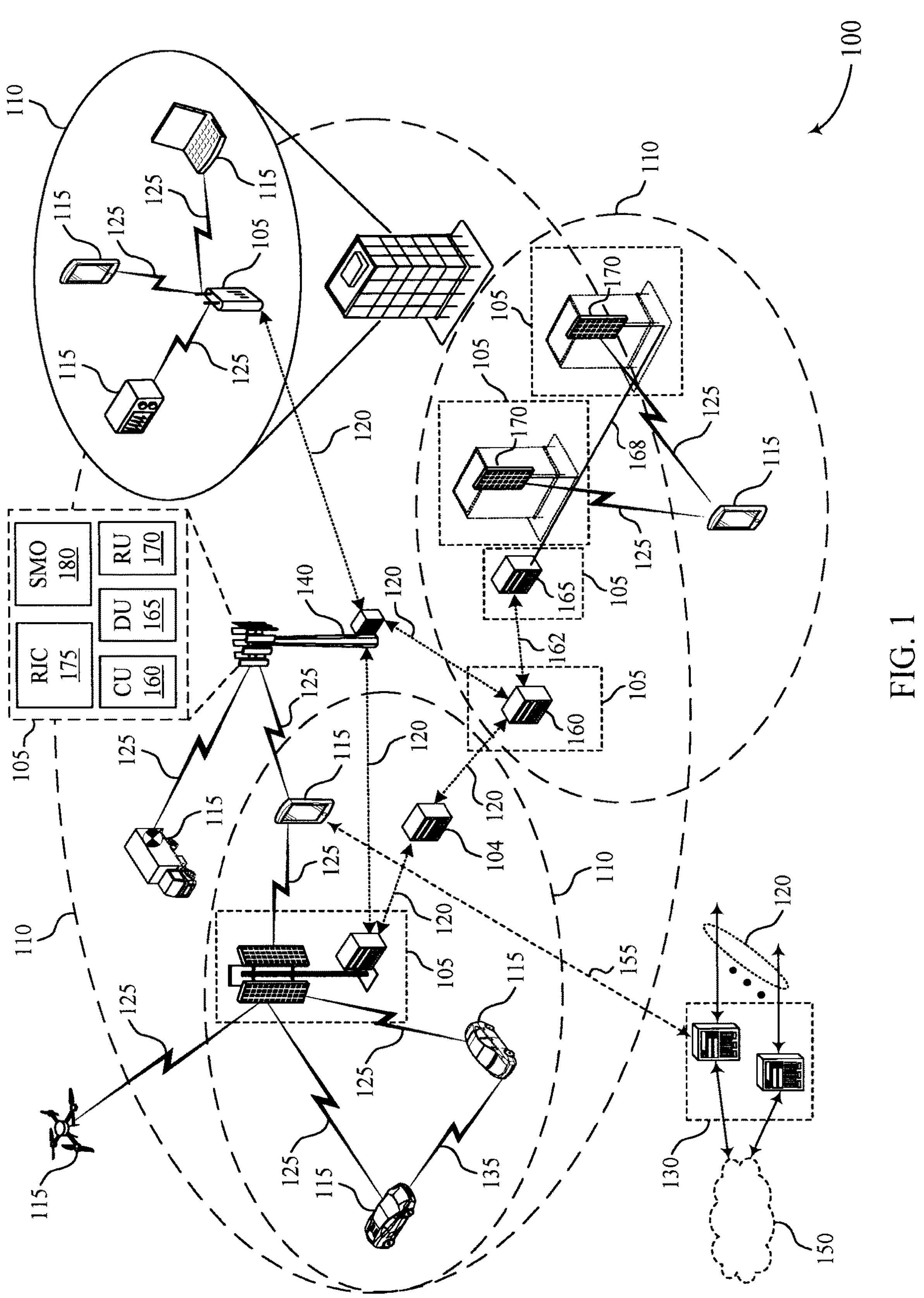
FIG. 1 shows an example of a wireless communications system that supports semi-persistent scheduling (SPS) and compression adaptation in accordance with one or more aspects of the present disclosure.

Some wireless communications systems may support extended reality (XR) communications, in which an XR device, which may be referred to as an XR user, may process XR communications received from a network entity. However, some XR devices may support a limited set of processing capabilities and may be unable to process the XR communications at the XR device. As such, the XR device may be associated with a companion device, such as a user equipment (UE). In such cases, the UE may receive the XR communications from the network entity and may process the XR communications, forwarding the processed XR communications to the XR device. That is, the UE may process the XR communications such that the XR device transmits, to the UE, sensor information without pre-processing and receives, from the UE, rendered videos to be displayed without post-processing.

In some cases, the UE may communicate with the XR device over a channel via a set of semi-persistent (SP) resources associated with one or more semi-persistent scheduling (SPS) periods. In some examples, channel conditions associated with the channel between the UE and the XR device may change during an SPS period, which may impact effective link capacities within the SPS period, which may further result in dropped frames and/or buffering at the XR device, among other disadvantages. As such, the network entity may transmit additional control signaling modifying the SPS resource configuration to avoid the buffering, however, the additional control signaling may result in increased latency, increased complexity, reduced efficiency, and increased power consumption. Additionally, the UE may communicate with multiple XR devices which may require different modifications to the SPS resource configuration which may result in further complexity.

Accordingly, techniques described herein may enable a UE to adapt a compression parameter of one or more signals to be transmitted to multiple XR devices during an SPS period to reduce dropped frames, reduce buffering, and improve communication efficiency. For example, the UE may transmit, to multiple XR devices, control signaling indicating an SPS configuration. That is, the control signaling may indicate SP resources for the multiple XR devices scheduling within a set of SPS periods (e.g., resource reservation periods). The UE may measure one or more conditions, such as channel capacity and spectral efficiency, of a channel associated with the SP resources during a first SPS period of the set of SPS periods. As such, the UE may adapt a compression parameter of one or more signals to be transmitted to the multiple XR devices during the first SPS period based on the one or more channel conditions. For example, the UE may increase the compression parameter based on a decrease in a channel capacity, a decrease in a spectral efficiency, or both. Alternatively, the UE may decrease the compression parameter based on an increase in the channel capacity, an increase in the spectral efficiency, or both. Accordingly, the UE may generate one or more compressed signals based on the compression parameter and the one or more signals and transmit the one or more compressed signals to the multiple XR devices.

Aspects of the disclosure are initially described in the context of wireless communications systems. Aspects of the disclosure are then described in the context of a timing diagram and a process flow. Aspects of the disclosure are further illustrated by and described with reference to apparatus diagrams, system diagrams, and flowcharts that relate to semi-persistent scheduling and compression adaptation.

FIG. 1 shows an example of a wireless communications system 100 that supports SPS and compression adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support SPS and compression adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems, such as the wireless communications system 100, may support XR communications, in which an wireless device, such as an XR device (e.g., XR glasses, XR goggles, etc.) may process XR communications received from a network entity 105. Some XR devices may attempt to support a lightweight design (e.g., to support long time, on-the-go use). For example, the XR device may support a lightweight battery and may weight 30 to 40 grams. Additionally, or alternatively, some XR devices may support limited processing capabilities (e.g., complexity) and power consumption within a power consumption threshold (e.g., available heat dissipation). For example, the power consumption threshold may be based on threshold level of heat dissipation (e.g., smaller than for a UE 115 based on a proportionally smaller surface size of the XR device compared to the UE 115), based on a battery lifetime (e.g., balance between battery size and battery lifetime), or both.

However, some XR devices (e.g., standalone XR devices) may be unable to satisfy one or more of the weight, processing capability, or power consumption considerations due to processing associated with some XR applications (e.g., heavy processing used to support the XR applications). In such cases, an XR device may be associated with a companion device, such as a UE 115 (e.g., to reduce complexity on the XR device). In such cases, the UE 115 may receive the XR communications from a network entity 105 and may process the XR communications, forwarding the processed XR communications to the XR devices, which may be referred to as a split XR design (e.g., approach). In such cases, the UE 115 may perform rendering related processing of received XR communications, which may reduce power consumption at the XR devices. However, the XR devices may be associated with one or more processing components to support one or more capabilities (e.g., end-to-end considerations), such as photon-to-motion latency (e.g., latency requirements), XR device to UE 115 link capacity, communication link power consumption (e.g., for long range links), or the like thereof.

In some examples, split XR designs may support long range communications links over a licensed spectrum (e.g., with tight scheduling and staggering among different served XR devices, or users). In such cases, an XR device may support at least a portion of sensor processing (e.g., six degrees of freedom tracking, eye tracking for field of view derivation, etc.) at the XR device (e.g., based on a capacity per user limitation) to reduce uplink data volume. Additionally, or alternatively, one or more portions of sensor data transmitted by the XR device (e.g., critical sensor or camera data) or received by the XR device (e.g., rendered video) may be compressed (e.g., with a very high compression factor) due to a link capacity per XR device (e.g., user). Sensor data processing at the XR device and video compression (e.g., with a sufficiently high compression factor, high profile of H264) may be associated with increased complexity (e.g., particularly at an encoder) and may result in increased double data rate (DDR) usage for both transmission and reception path video processing. Additionally (e.g., due to photon-to-motion latency requirements and network entity 105 split related latencies), receiver side processing of the XR device may include asynchronous time wrapping (ATW) for image alignment with pose information.

As such, additional split XR designs may be supported by an XR device. For example, offloading of processing to a companion device (e.g., UE 115) located within a proximity threshold to the XR device may be accomplished-such that processing may be split between the XR device, a companion device, and a network entity 105, or both. The additional split designs may support a similar processing load and locally covered functionality on the XR device side (e.g., as compared to the split XR design discussed previously) and a short range communication link (e.g., 5G NR sidelink or WIFI) with the comparison device, which may support decreased power consumption (e.g., reduce only model related power consumption).

In some examples, additional processing capabilities may be offloaded from the XR device to the UE 115 (e.g., or UE 115 and network entity 105), such that the XR device may support (e.g., be converted to) an input/output (I/O) device. That is, the XR device may transmit, to the UE 115, local sensor information without pre-processing and receive, from the UE 115, rendered video to be displayed directly without post-processing. As such, the XR device may support fully offloading the processing to the UE 115, light compression and distributed video coding (DVC) for uplink data (e.g., to minimize video encoding related power consumption), radio frequency band utilization for an XR local link (e.g., or sidelink), a waveform associated with (e.g., optimized for) lower power XR communications (e.g., and used for local link bands, such as ultra-wideband (UWB), sidelink NR, and WIFI band), cross layer adaptation (e.g., optimization) for XR communications, and/or reduced DDR processing at the XR device.

In some examples, XR communications systems may support reduced latency (e.g., as compared to other communications systems). Latency in an XR communications system may be based on processing related latency, split XR architecture, and physical (PHY) latency (e.g., overall end to end latency may comply with motion-to-photon latency requirements). In some examples, PHY latency may be based on multiple factors, including, but not limited to, availability or allocation of link resources, scheduling procedures, alignment between video refresh periods data volume per frame (e.g., which may be variable based on an effective video compression factor per frame), and resource allocation patterns, channel conditions, channel capacity, link adaption procedure (e.g., targeting to reduce retransmission probability and a corresponding latency increase or penalty), or any combination thereof.

In some examples, a threshold (e.g., maximum) data volume (e.g., throughput, rate) that may be transmitted via a channel without errors may be based on available time and frequency resources and a corresponding effective link capacity. Additionally, a channel capacity may be based on channel conditions. As such, channel conditions may be associated with an upper bound on a quantity (e.g., amount) of information bits that may be transmitted over the channel without errors. In some cases, a UE 115 may perform link adaption to determine a level of protection (e.g., code rate or modulation and encoding scheme (MCS)) over the information bits such that a threshold (e.g., desired) packet error rate (PER) may be satisfied. However (e.g., if there is uncertainly or a mismatch in link adaption and channel state information (CSI)), in some examples, a quantity of transmitted information bits may exceed a channel capacity. In such cases, the UE 115 may perform retransmissions of at least a portion of the transmitted information bits, which may result in increased latency (e.g., frame latency exceeding a delay budget), additional scheduling (e.g., scheduling complexity), additional power consumption (e.g., additional power consumption penalties on extra control signaling), and implications on multiple XR users sharing the channel. As such, one or more frames may be dropped by the XR device, resulting in impacts to user experience.

In some cases, the wireless communications system 200 may enable a UE 115 to adapt a compression parameter of one or more signals to be transmitted to multiple XR devices during an SPS period to reduce dropped frames, reduce buffering, and improve communication efficiency. For example, the UE 115 may transmit, to multiple XR devices, control signaling indicating an SPS configuration. That is, the control signaling may indicate SP resources for the multiple XR devices scheduling within a set of SPS periods (e.g., resource reservation periods). The UE 115 may measure one or more conditions, such as channel capacity and spectral efficiency, of a channel associated with the SP resources during a first SPS period of the set of SPS periods. As such, the UE 115 may adapt a compression parameter of one or more signals to be transmitted to the multiple XR devices during the first SPS period based on the one or more channel conditions. For example, the UE 115 may increase the compression parameter based on a decrease in a channel capacity, a decrease in a spectral efficiency, or both. Alternatively, the UE may decrease the compression parameter based on an increase in the channel capacity, an increase in the spectral efficiency, or both. Accordingly, the UE 115 may generate one or more compressed signals based on the compression parameter and the one or more signals and transmit the one or more compressed signals to the multiple XR devices.

Figure 2:
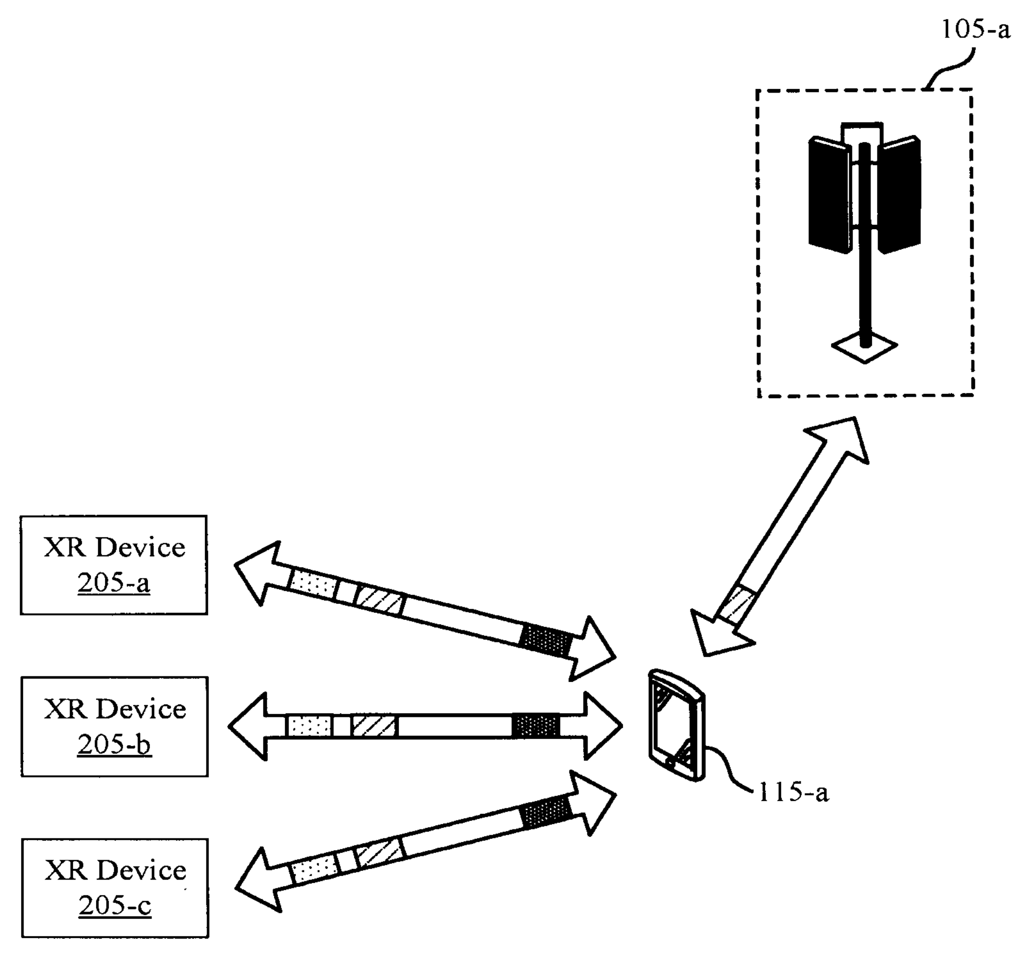
FIG. 2 illustrates an example of a wireless communications system that supports SPS and compression adaptation in accordance with one or more aspects of the present disclosure.
Figure 2:
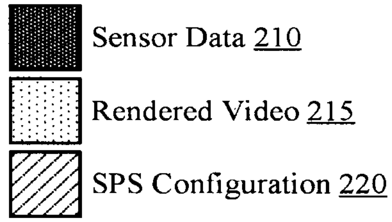

FIG. 2 illustrates an example of a wireless communications system 200 that supports SPS and compression adaptation in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-*a*) and one or more UEs 115 (e.g., a UE 115-*a*), which may be examples of the corresponding devices as described with reference to FIG. 1.

Some wireless communications systems, such as the wireless communications system 200, may support XR communications. As described previously with reference to FIG. 1, XR devices 205, such as an XR device 205-*a*, an XR device 205-*b*, and an XR device 205-*c*, may communicate with a network entity 105, such as the network entity 105-*a*, via a companion device, such as the UE 115-*a*. That is, the UE 115-*a* may process XR communications, such that the XR devices 205 transmit, to the UE 115-*a*, sensor data 210 (e.g., sensor information) without pre-processing and receive, from the UE 115-*a*, rendered videos 215 to be displayed without post-processing, which may reduce power consumption at the XR devices 205.

In some cases, the UE 115-*a* may communicate with the XR devices 205 over a channel via a set of SP resources associated with one or more SPS periods (e.g., to enable XR entity multiplexing on a shared channel). That is (e.g., due to a quasi-periodic nature of XR traffic), the network entity 105-*a* may transmit an SPS configuration 220 scheduling resources associated with the XR devices 205 in an SP manner (e.g., the network entity 105-*a* allocates one or more resources semi-statically over a time interval) in which resources for the different XR devices 205 (e.g., XR entities, sometimes referred to as XR users) may be staggered in time, as described with reference to FIG. 3. Additionally, or alternatively, the UE 115-*a* may transmit the SPS configuration 220 scheduling resources associated with the XR devices 205 to the XR devices 205 (e.g., the UE 115-*a* allocates the resources independent of the network entity 105-*a* or based on the SPS configuration received from the network entity 105-*a*). SPS (e.g., or deterministic scheduling) may enable the UE 115-*a* to reduce PHY scheduling latency and reduce complexity and power consumption on the XR devices 205 (e.g., related to control signaling). For example, as described with reference to FIG. 3, once per SPS period (e.g., FPS period), the UE 115-*a* may allocate (e.g., via an SPS configuration 220) one or more SP resources to each XR device 205 (e.g., a-priory or SPS assigned) based on one or more channel conditions (e.g., link conditions) associated with a channel (e.g., associated with the SPS resources) at a time at which the UE 115-*a* allocates the one or more SP resources. The one or more channel conditions may include interference levels or an interference intensity (e.g., pre-determined interference based on the channel being associated with an UWB), average source rate, jitter for source rate, MCS fluctuations, potential retransmissions, or any combination thereof.

In some examples, SPS may be based on traffic characteristics, a frame data burst start time, a data volume per frame, or any combination thereof. However, variable video processing latency (e.g., related to rendering) and video compression performance (e.g., latency and/or compressed data volume) may result in variations in the traffic characteristics, the frame data burst start time, the data volume per frame, or any combination thereof, which may add complexity to SPS. In some examples, timing jitter, data volume jitter, or both, across frames may be reduced (e.g., minimized) based on one or more communication characteristics associated with the wireless communications system 200 (e.g., overall system design), may be accounted for in advance (e.g., prior to transmission) via priority margins in the SPS resources, or both. That is, the SPS configuration 220 may include a quantity of additional SP resources (e.g., per user) to account for a quantity of retransmission per user per frame (e.g., which may be fully or partially released for other usage if not used for a specific frame). However, in some cases, channel conditions (e.g., link conditions) between the UE 115-*a* and the XR devices 205 may change during an SPS period, which may impact a link capacity (e.g., effective link capacity) per XR device 205 (e.g., XR user) during the SPS period, which may further result in dropped frames, buffering, or both, at the XR devices 205, among other disadvantages.

In some examples, as discussed previously, the SPS configuration 220 may include a quantity of additional SP resources (e.g., per user) to account for a quantity of retransmission per user per frame, however, it may be desired to reduce the quantity of additional resources (e.g., retransmission resource budget). As such, the UE 115-*a* may adapt (e.g., calibrate) a compression parameter per frame, individually per user (e.g., to adopt to the SPS configuration 220). For example, the SPS configuration 220 may indicate a higher code rate (CR) margin (e.g., as compared to a larger quantity of additional resources), however, the higher code rate may impact an overall transmission capacity or a quantity of multiplexed user capable of being supported by the UE 115-*a*. Additionally, a CR margin below a threshold (e.g., if too aggressive of a CR margin is used) may result in an increase in the quantity of additional SP resources associated with the quantity of retransmissions per user per frame due to variations in channel conditions, channel condition uncertainty, or both, which may result in increased latency, additional scheduling (e.g., extra resources scheduling procedure), or both. For example, the UE 115-*a* may transmit additional scheduling to adjust the SPS configuration 220 (e.g., adapt an FPS, basic video resolution, targeted minimum compression factor). The increased latency, additional scheduling, or both, may further result in impacts to the staggering of resources for different XR devices 205 (e.g., in conjunction with SPS), as well as an increased overhead (e.g., control signaling) and power consumption. That is, channel conditions associated with a channel between the UE 115-*a* and the XR devices 205 may change (e.g., during an SPS period), which may impact effective link capacities (e.g., within the SPS period), which may further result in dropped frames buffering, or both, at the XR devices 205, among other disadvantages.

Accordingly, techniques described herein may enable a UE 115, such as the UE 115-*a*, to adapt a compression parameter associated with one or more signals to be transmitted to multiple XR devices 205, such as the XR device 205-*a*, the XR device 205-*b*, and the XR device 205-*c*, based on one or more channel conditions (e.g., of a channel) to support reduced latency (e.g., PHY latency minimization), increased capacity and resource utilization, reduced scheduling, reduced complexity (e.g., user multiplexing complexity), and reduced power consumption (e.g., modem power consumption). That is, adapting the compression parameter may enable the UE 115-*a* to adapt transmissions to the multiple XR devices 205 based on a link capacity (e.g., effective, available link capacity) associated with the channel (e.g., achieve a tight channel capacity tracking adaption constrained to SPS) rather than increasing a frequency at which SP resources associated with the XR device 205 are rescheduled (e.g., rescheduled, per frame schedule, extra scheduling). In other words, adapting the compression parameter (e.g., increasing compression/decreasing video resolution/quality) may enable the UE 115-*a* to adapt (e.g., adopt) a compressed bit rate to the one or more channel conditions (e.g., available link capacity, interference, channel capacity variations, video data characteristic variations across frames, etc.).

For example, the UE 115-*a* may transmit, to the XR devices 205, an SPS configuration 220 indicating SP resources for the XR devices 205 scheduled within a set of SPS periods (e.g., resource reservation periods). In some examples, the UE 115-*a* may transmit the SPS configuration 220 to the XR devices 205 based on an SPS configuration 220 received from the network entity 105-*a*. Additionally, or alternatively, the UE 115-*a* may transmit the SPS configuration 220 to the XR devices 205 independent of the network entity 105-*a* (e.g., may not receive an SPS configuration 220 from the network entity 105-*a*). In such cases, the SPS configuration 220 may be based on a first set of channel conditions associated with a channel (e.g., associated with the SP resources) at a time at which the SP resources are allocated to the XR devices 205 (e.g., channel conditions assumed by the network entity 105-*a*). For example, the first set of channel conditions may include a channel capacity (e.g., capacity of bits per channel use), a spectral efficiency (e.g., bits per second per hertz), or both. In some examples (e.g., LTE and 5G NR), the network entity 105-*a* may determine (e.g., evaluate) the spectral efficiency of the channel based on measuring one or more sounding reference signals (SRS). Additionally, or alternatively, the UE 115-*a* may determine (e.g., evaluate) the spectral efficiency of the channel based on measuring one or more channel state information reference signals (CSI-RSs) and may report (e.g., implicitly) the spectral efficiency to the network entity 105-*a* via a CSI report.

Additionally, the UE 115-*a* may measure a second set of channel conditions of the channel during a first SPS period (e.g., per frame or intra-frame) of the set of SPS periods (e.g., to identify channel fluctuations due to interference, blockage, fading, or the like thereof). The second set of channel conditions may include a channel capacity (e.g., capacity of bits per channel use), a spectral efficiency (e.g., bits per second per hertz, or both (e.g., similar to the first set of channel conditions). In some examples (e.g., LTE and 5G NR), the UE 115-*a* may determine (e.g., evaluate) the spectral efficiency of the channel based on measuring one or more CSI-RSs. Additionally, or alternatively, the UE 115-*a* may receive (e.g., periodically) an indication of the spectral efficiency form the network entity 105-*a*. In some examples, the UE 115-*a* may determine the second set of channel conditions based on one or more links (e.g., associated with the channel) used by the UE 115-*a* to receive signaling from the XR devices 205 (e.g., any reception reference signal or intermediate demodulation or decoding metric). That is, channel reciprocity may exist between the one or more links used by the UE 115-*a* to receive signaling from the XR devices 205 (e.g., reception links) and one or more links used by the UE 115-*a* to transmit signaling to the XR devices 205 (e.g., transmission links), such that the UE 115-*a* may estimate (e.g., determine) the second set of channel conditions based on the one or more reception links (e.g., which are representative of the one or more transmission links or a nearest transmission session).

Accordingly, the UE 115-*a* may adapt a compression parameter of one or more signals to be transmitted to the XR devices 205 during the first SPS period. That is, the UE 115-*a* may adapt a rate (e.g., compression data rate) at which data associated with the one or more signals is compressed (e.g., by a codec or video compressor) based on the adapted compression parameter. For example, the UE 115-*a* may be associated with a encoder (e.g., an H.264 encoder) and the encoder may be associated with a component (e.g., Rate-Distortion Optimization (RDO) component) that determines a distortion level and a bit rate associated with encoding data. That is, the component may perform a prediction hypotheses (e.g., specific intra/inter prediction hypothesis option) selection algorithm per macro-block, sub-block, or both, such that the distortion level and bitrate associated with encoding the data minimizes the following Equation 1:

$$J = D + \lambda(C) \cdot R \quad (1)$$

where the parameter D may represent the distortion level (e.g., compression distortion) within a block, R may represent a bit rate (e.g., compression factor), and λ may represent a weighting parameter designed to balance the bitrate and the distortion level. Additionally, λ may be a function of the channel conditions (e.g., channel capacity, channel allocation, spectral efficiency, or any combination thereof), such that C may represent the compression parameter, which may be based on one or more channel conditions (e.g., effective channel or allocation capacity).

As such, the UE 115-*a* may determine a bit rate and a distortion level associated with the one or more signals to be transmitted based on the adapted compression parameter, which may be based on the second set of channel conditions. In such cases, a value of λ may change in a direction opposite of C. For example, when C decreases (e.g., a channel capacity decreases, spectral efficiency decreases), λ may increase, and R may decrease (e.g., be lower) as compared to a higher (e.g., initial) value of C. In other words, the UE 115-*a* may achieve a lower bitrate at the encoder output (e.g., to adapt to degraded channel conditions). Conversely, when C increases (e.g., the channel capacity increases, spectral efficiency increases), λ may decrease, and R may increase (e.g., be higher) as compared to a lower (e.g., initial) value of C. In other words, the UE 115-*a* may achieve a higher bitrate at the encoder output (e.g., to adapt to improved channel conditions).

In other words, the UE 115-*a* may update λ (e.g., or an equivalent RDO parameter in other codecs that affect a trade-off between a compression distortion and a compression factor) in-frame (e.g., every ¼ frame for example). In such cases, the UE 115-*a* may perform frame compression over smaller units (e.g., such as a macro-block in H.264), in a sequential (e.g., progressive manner), or both. Additionally, or alternatively, the UE 115-*a* may output compressed video data to (e.g., directly to) a PHY layer at the UE 115-*a* with latency less than a threshold (e.g., without significant latency in the encoding and PHY pipeline). Latency less than a threshold may be achieved based on alignment between an allocated resource pattern and encoder processing cycle timing (e.g., as expected for XR uplink in which sensor data may be transmitted directly to a video encoder and PHY later without any pre-processing).

Additionally, or alternatively, the UE 115-*a* may adjust an output data volumed per frame of the encoder based on a fixed (e.g., required) value associated with a frame volume threshold (e.g., constraint). In other words, the frame volume constraint may indicate that a frame may be transmitted using pre-defined (e.g., allocated) per frame resources. In such cases, the UE 115-*a* may increase λ (e.g., or the equivalent RDO parameter in other codecs that affect a trade-off between a compression distortion and a compression factor) as the resources get filled (e.g., allocated) from an initial threshold to support a final size (e.g., volume) of the resources meets the frame volume threshold (e.g., per frame) to avoid compressed frame data volume fluctuations across frames (e.g., depending on frame characteristics or an effective compression factor per frame).

By adapting the compression parameter (e.g., video compression process) based on the one or more channel conditions (e.g., instant, per frame, effective channel capacity), an encoder (e.g., image or video) at the UE 115-*a* may adjust (e.g., change) an outputted bit-rate based on the one or more channel conditions (e.g., to match the channel capacity), available resources, or both, and may adjust a quantity (e.g., volume) of transmitted information bits on a per frame basis (e.g., constrained to SPS in advance).

Additionally, or alternatively, adaption of the compression parameter may enable the UE 115-*a* to avoid frame drops by maintaining (e.g., keep constant) a frame rate associated with each XR device 205 (e.g., under strict latency constraints), avoid latency increases associated with a PHY layer of the UE 115-*a*, and avoid increased in power consumption associated with additional control signaling (e.g., additional allocation signaling) or retransmissions. That is, adaption of the compression parameter (e.g., rate adaption), may enable graceful degradation of video quality for users associated with the XR devices 205 rather than an increased frame drop probability due to an exceeding a delay budget (e.g., with retransmission and rescheduling involved), increased power consumption, and a less efficient channel capacity utilization for multiple-device scenarios (e.g., due to expected channel conditions from a perspective of the network entity 105-*a*, data volume increase, or a frame start delay causing a deficit of a-priory allocated resources).

Though described in the context of SPS periods and XR devices, this is not to be regarded as a limitation of the present disclosure. Indeed it is contemplated herein that the UE may adapt a compression parameter of one or more signals to be transmitted to multiple XR devices during an SP period. In this regard, any type of resource configuration, any type of wireless device, or both, may be considered with regarding the techniques described herein.

Figure 3:
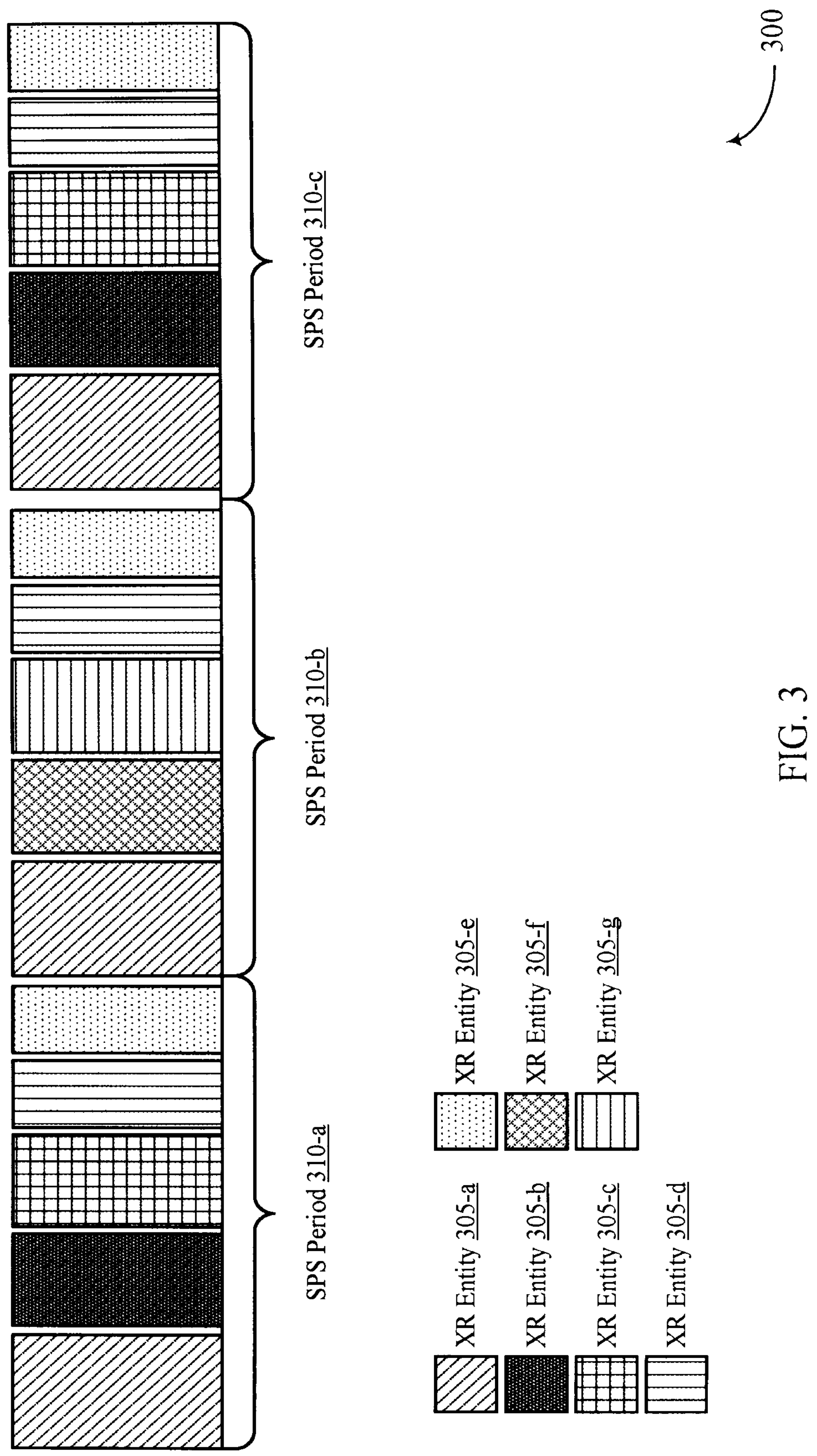
FIG. 3 illustrates an example of a timing diagram that supports SPS and compression adaptation in accordance with one or more aspects of the present disclosure.

FIG. 3 illustrates an example of a timing diagram 300 that supports SPS and compression adaptation in accordance with one or more aspects of the present disclosure. In some examples, the timing diagram 300 may implement or be implemented by aspects of the wireless communications system 100 or the wireless communications system 200. For example, the timing diagram 300 may include one or more network entities 105 and one or more UEs 115, which may be examples of the corresponding devices as described with reference to FIG. 1.

As described previously with reference to FIG. 2, a UE 115 may communicate with multiple XR entities 305 (e.g., an XR entity 305-*a*, an XR entity 305-*b*, an XR entity 305-*c*, an XR entity 305-*d*, an XR entity 305-*e*, an XR entity 305-*f*, and an XR entity 305-*g*) according to an SPS configuration. That is, the UE 115-*a* may transmit, to the XR entities 305, a control message indicating one or more resources, which may be referred to as SP resources, associated with a set of resource reservation periods, which may be referred to as SPS periods 310. In some cases, an XR entity 305 may be referred to as an XR user. An XR device may be associated with one or more XR entities 305. For example, the UE 115 may communicate with a centralized XR device and the centralized XR device may serve the multiple XR entities 305 (e.g., directly or via additional devices). In such cases, the network entity 105 may transmit signaling to the multiple XR entities 305 via the centralized XR device. Conversely, an XR device maybe associated with a single XR entity 305, such that the UE 115 may communicate with each XR entity 305 of the multiple XR entities 305 via respective XR devices. Additionally, the network entity 105 may allocate (e.g., assign) SP resources to each XR entity 305 (e.g., multiplexed XR entities) such that allocated SP resources are staggered in time (e.g., are TDMed). That is, the network entity 105 may allocated each XR entity 305 with a continuous set of one or more SP resources (e.g., continuous allocation) in a time domain per SPS period 310 associated with the respective XR entity 305 for uplink transmissions, downlink transmissions, or both (e.g., with TDD, full duplex, or sub-band full duplex (SBFD)). Additionally, each XR entity 305 may be associated with a different FPS rate based on a capability of the XR entity 305, one or more applications run by the XR entity 305, or both.

For example, the XR entity 305-*a* may be associated with a first FPS rate (e.g., a highest FPS rate of FPS rates associated with the XR entities 305) and may be allocated SP resources in an SPS period 310-*a*, an SPS period 310-*b*, and an SPS period 310-*c* based on the first FPS rate. The XR entity 305-*b*, the XR entity 305-*c*, the XR entity 305-*f*, and the XR entity 305-*g* may each be associated with a second FPS rate that is less than the first FPS rate. As such, the XR entity 305-*b*, the XR entity 305-*c*, the XR entity 305-*f*, and the XR entity 305-*g* may each be allocated SP resources every other SPS period 310 (e.g., every 2 SPS periods 310). Additionally, the XR entity 305-*d* and the XR entity 305-*e* may be associated with the first FPS rate and, as such, may each be allocated SP resources each SPS period 310.

In such cases, the allocation of the SP resources (e.g., may perform an SP resources assigned, constant unless stated otherwise) may enable the SP resources to be adapted (e.g., long term) to channel conditions (e.g., per XR entity 305) and to a quantity of XR entity 305 (e.g., each XR entity 305 may be associated with a periodic nature of traffic according to an associated frame per second (FPS)). That is, as described with reference to FIG. 2, the UE 115-*a* may adapt a compression parameter associated with one or more signals to be transmitted to the XR entities 305 during an SPS period 310, such that the FPS rate associated with each XR entity 305 is adapted based on one or more channel conditions during the SPS period 310 (e.g., cross-layer optimization and interoperability between a PHY and application or video processing layer). In such cases (e.g., for per frame adaptions), one or more XR applications associated with the multiple XR entities 305 may be associated with a same interface and logical interconnection between a PHY layer of the respective XR entity 305 and one or more video processing components. Additionally, or alternatively, encoders (e.g., video encoders) of the multiple XR entities 305 may be associated with a same set of functions.

Figure 4:
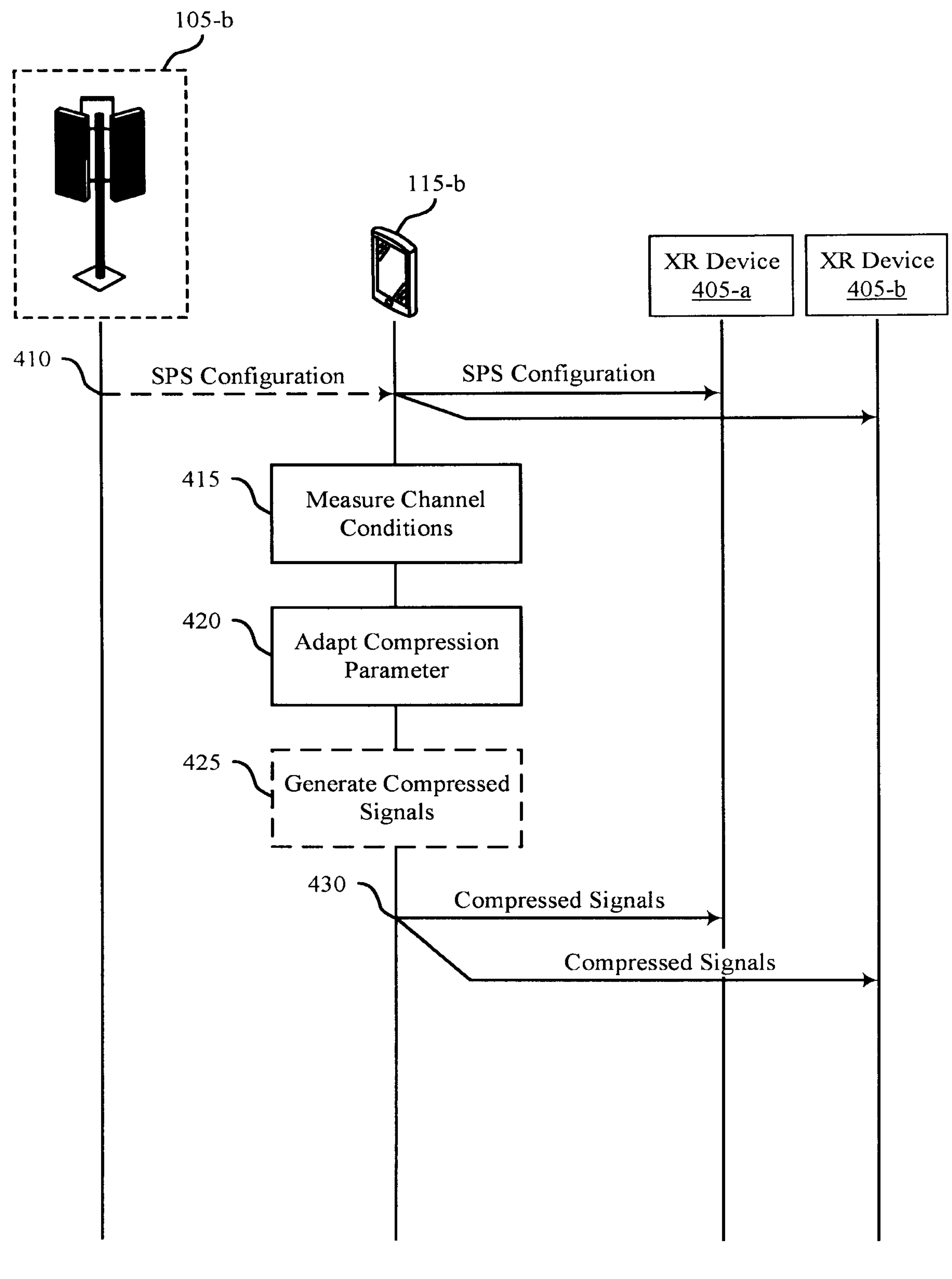
FIG. 4 illustrates an example of a process flow that supports SPS and compression adaptation in accordance with one or more aspects of the present disclosure.

FIG. 4 illustrates an example of a process flow 400 that supports SPS and compression adaptation in accordance with one or more aspects of the present disclosure. In some examples, the process floe 400 may implement or be implemented by aspects of the wireless communications system 100, the wireless communications system 200, or the timing diagram 300. For example, the process flow 400 may include one or more network entities 105 (e.g., a network entity 105-*b*) and one or more UEs 115 (e.g., a UE 115-*b*), which may be examples of the corresponding devices as described with reference to FIG. 1.

At 410, the UE 115-*b* may transmit, to multiple XR devices 405, a control message that indicates SP resources for the multiple XR devices 405 (e.g., wireless devices), such as an XR device 405-*a* and an XR device 405-*b*, scheduled within a set of resource reservation periods (e.g., SPS period, FPS period). In some examples, the UE 115-*a* may receive, from the network entity 105-*b*, an additional control message indicating the SP resources for the multiple XR devices 405 and may transmit the control message to the multiple XR devices 405 based on receiving the additional control message from the network entity 105-*b*. Additionally, or alternatively, the UE 115-*a* may determine the SP resources for the multiple XR devices 405 independent of the network entity 105-*ab* (e.g., may not receive the additional control message from the network entity 105-*b*)

At 415, the UE 115-*b* may measure one or more channel conditions of a channel during a first resource reservation period of the set of resource reservation periods. The channel may be associated with the SP resources for communications between the UE 115-*b* and the multiple XR devices 405. In some examples, the UE 115-*b* may determine the one or more channel conditions based on one or more reference signals. That is, the UE 115-*b* may measure one or more reference signals during the first resource reservation period to determine the one or more channel conditions. In such cases, the one or more reference signals may be measure via a PHY layer of the UE 115-*b*.

At 420, the UE 115-*b* may adapt a compression parameter of one or more signals to be transmitted to the multiple XR devices 405 during the first resource reservation period based on the one or more channel conditions. The one or more channel conditions may be based on a channel capacity of the channel, a spectral efficiency associated with the channel, or both. Additionally, or alternatively, the compression parameter may be adapted over a duration of a single frame, adapted via an application layer of the UE 115-*b*, or both.

In some examples, the UE 115-*b* may increase the compression parameter based on a decrease in the channel capacity, a decrease in a spectral efficiency, or both. Additionally, the UE 115-*b* may decrease a bit rate associated with each XR device 405 of the multiple XR devices 405 based on increasing the compression parameter. Alternatively, the UE 115-*b* may decrease the compression parameter based on an increase in the channel capacity, an increase in the spectral efficiency, or both. Additionally, the UE 115-*b* may increase the bit rate associated with each XR device 405 of the multiple XR devices 405 based on decreasing the compression parameter.

In some examples, at 425, the UE 115-*b* may generate one or more compressed signals according to a frame rate associated with each XR device 405 of the multiple XR devices 405. That is, each XR device 405 may be associated with a frame rate. In such cases, one or more XR devices 405 of the multiple XR devices 405 may be associated with a same frame rate or different frame rates. In such cases, each frame rate may be based on the compression parameter. For example, the frame rate associated with each XR device 405 may be based on a distortion level associated with generation of the one or more compressed signals, a bit rate associated with generation of a subset of the one or more compressed signals associated with a respective XR device 405, or both.

In some examples, to generate the one or more compressed signals, the UE 115-*b* may generate a first subset of the one or more compressed signals according to a first rate, where the first frame rate is associated with the XR device 405-*a* (e.g., a first wireless device) of the multiple XR devices 405. Additionally, to generate the one or more compressed signals, the UE 115-*b* may generate a second subset of the one or more compressed signals according to a second rate, where the second frame rate is associated with the XR device 405-*b* (e.g., a first wireless device) of the multiple XR devices 405

At 430, the UE 115-*b* may transmit (e.g., via a PHY layer of the UE 115-*b*), to the multiple XR devices 405, the one or more compressed signals generated based on the compression parameter and the one or more signals. For example, the UE 115-*b* may transmit the first subset of the one or more signals to the XR device 405-*a* and the second subset of the one or more signals to the XR device 405-*b*.

Figure 5:
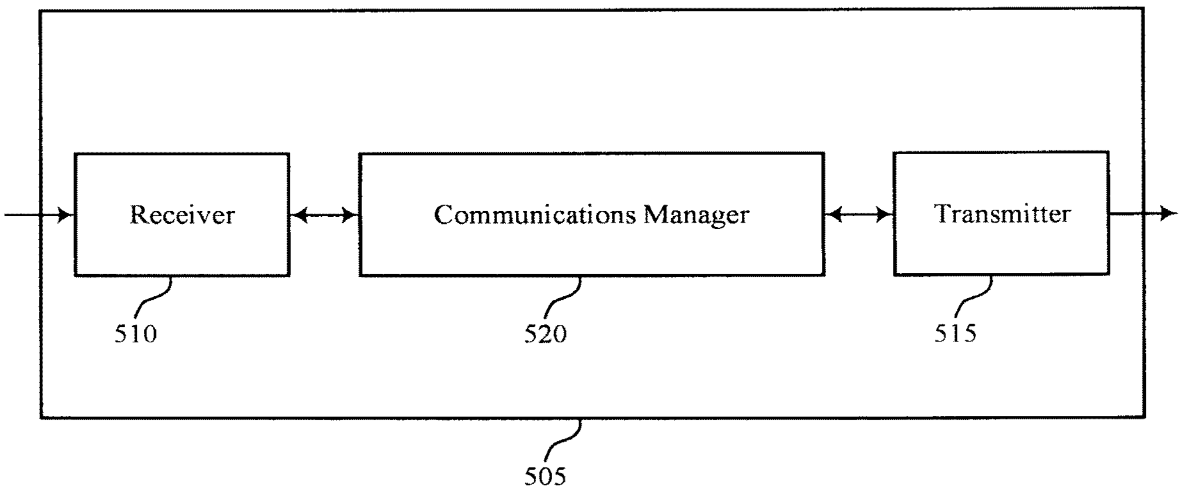
FIGS. 5 and 6 illustrate block diagrams of devices that support SPS and compression adaptation in accordance with one or more aspects of the present disclosure.

FIG. 5 illustrates a block diagram 500 of a device 505 that supports SPS and compression adaptation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to SPS and compression adaptation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SPS and compression adaptation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of SPS and compression adaptation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving a control message that indicates semi-persistent resources for a set of multiple wireless devices scheduled within a set of resource reservation periods. The communications manager 520 may be configured as or otherwise support a means for measuring one or more channel conditions of a channel during a first resource reservation period of the set of resource reservation periods, the channel associated with the semi-persistent resources for the set of multiple wireless devices. The communications manager 520 may be configured as or otherwise support a means for adapting a compression parameter of one or more signals to be transmitted to the set of multiple wireless devices during the first resource reservation period based on the one or more channel conditions. The communications manager 520 may be configured as or otherwise support a means for transmitting, to the set of multiple wireless devices, one or more compressed signals generated based on the compression parameter and the one or more signals.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for intra-SPS period compression adaption which may result in reduced processing, reduced power consumption, and more efficient utilization of communication resources, among other advantages.

Figure 6:
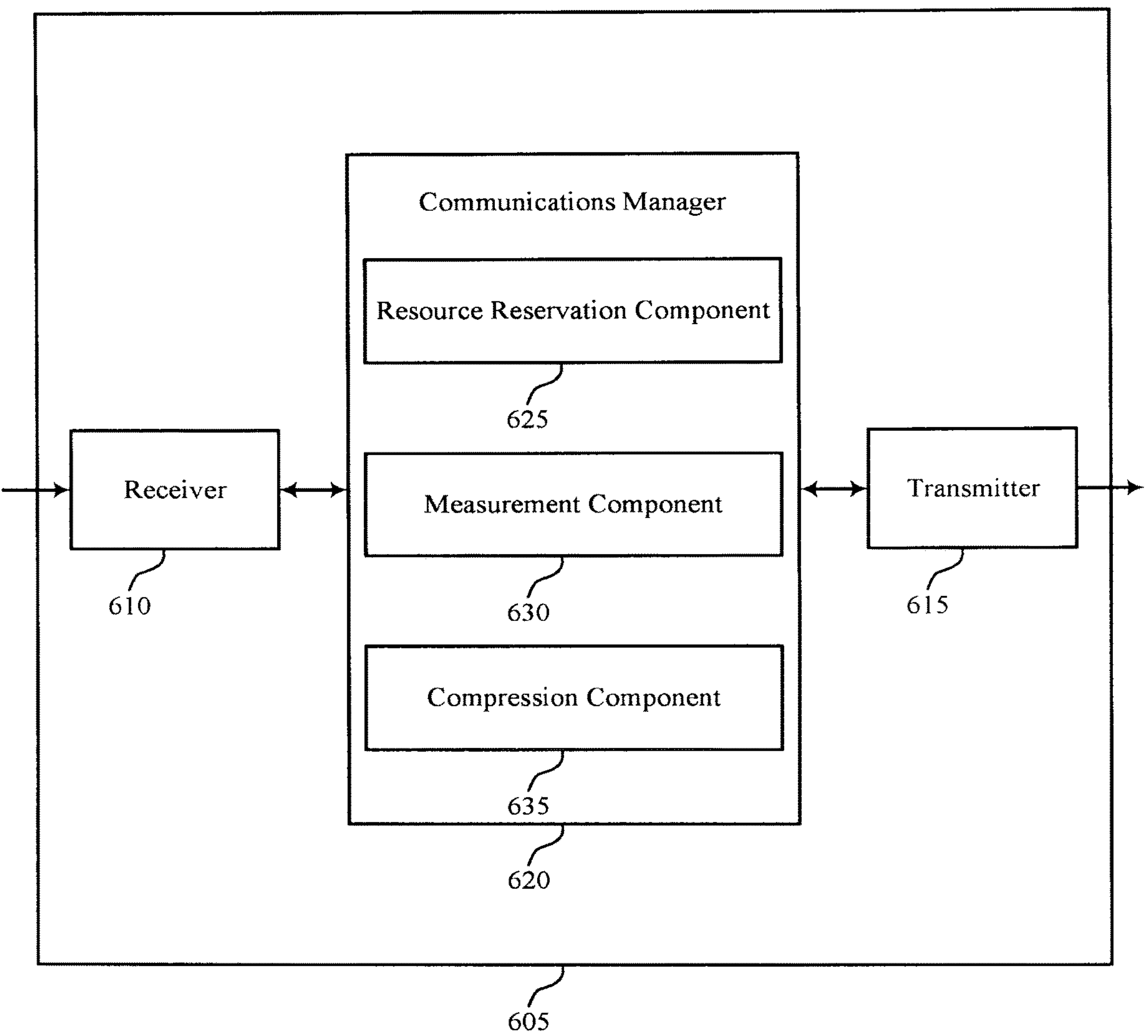

FIG. 6 illustrates a block diagram 600 of a device 605 that supports SPS and compression adaptation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to SPS and compression adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SPS and compression adaptation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of SPS and compression adaptation as described herein. For example, the communications manager 620 may include a resource reservation component 625, a measurement component 630, a compression component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The resource reservation component 625 may be configured as or otherwise support a means for receiving a control message that indicates semi-persistent resources for a set of multiple wireless devices scheduled within a set of resource reservation periods. The measurement component 630 may be configured as or otherwise support a means for measuring one or more channel conditions of a channel during a first resource reservation period of the set of resource reservation periods, the channel associated with the semi-persistent resources for the set of multiple wireless devices. The compression component 635 may be configured as or otherwise support a means for adapting a compression parameter of one or more signals to be transmitted to the set of multiple wireless devices during the first resource reservation period based on the one or more channel conditions. The compression component 635 may be configured as or otherwise support a means for transmitting, to the set of multiple wireless devices, one or more compressed signals generated based on the compression parameter and the one or more signals.

Figure 7:
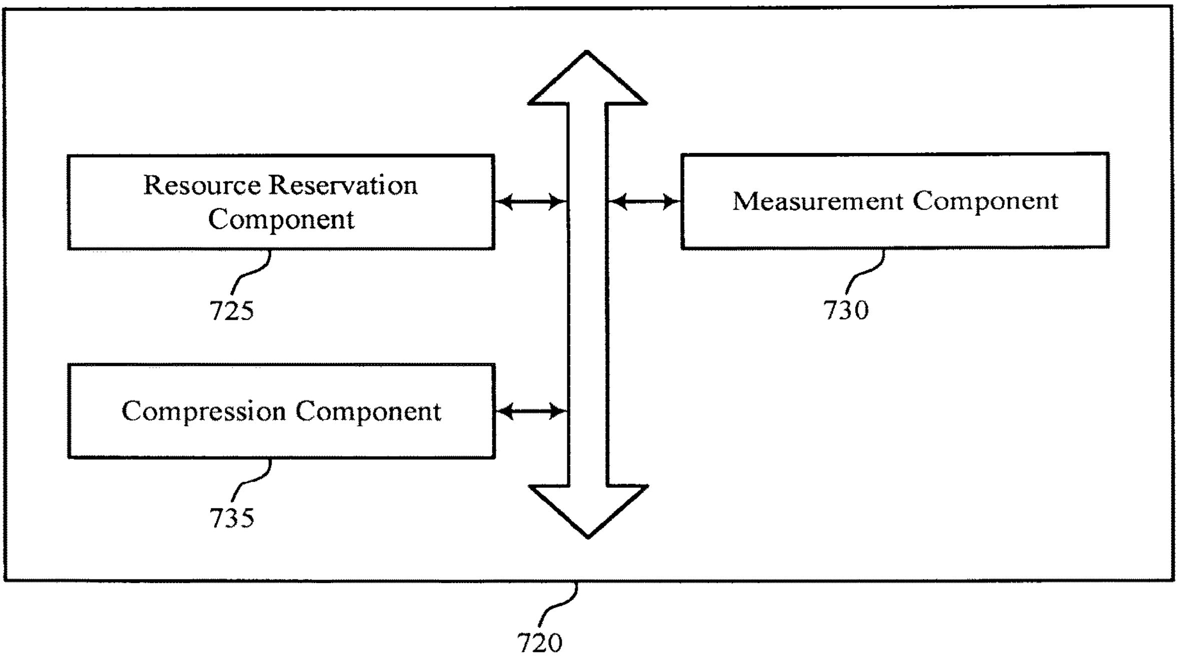
FIG. 7 illustrates a block diagram of a communications manager that supports SPS and compression adaptation in accordance with one or more aspects of the present disclosure.

FIG. 7 illustrates a block diagram 700 of a communications manager 720 that supports SPS and compression adaptation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of SPS and compression adaptation as described herein. For example, the communications manager 720 may include a resource reservation component 725, a measurement component 730, a compression component 735, or any combination thereof. Each of these components may communicate, directly or indirectly, with one another (e.g., via one or more buses).

The communications manager 720 may support wireless communications at a UE in accordance with examples as disclosed herein. The resource reservation component 725 may be configured as or otherwise support a means for receiving a control message that indicates semi-persistent resources for a set of multiple wireless devices scheduled within a set of resource reservation periods. The measurement component 730 may be configured as or otherwise support a means for measuring one or more channel conditions of a channel during a first resource reservation period of the set of resource reservation periods, the channel associated with the semi-persistent resources for the set of multiple wireless devices. The compression component 735 may be configured as or otherwise support a means for adapting a compression parameter of one or more signals to be transmitted to the set of multiple wireless devices during the first resource reservation period based on the one or more channel conditions. In some examples, the compression component 735 may be configured as or otherwise support a means for transmitting, to the set of multiple wireless devices, one or more compressed signals generated based on the compression parameter and the one or more signals.

In some examples, to support adapting the compression parameter, the compression component 735 may be configured as or otherwise support a means for increasing the compression parameter based on a decrease in a channel capacity, a decrease in a spectral efficiency, or both.

In some examples, to support adapting the compression parameter, the compression component 735 may be configured as or otherwise support a means for decreasing the compression parameter based on an increase in a channel capacity, an increase in a spectral efficiency, or both.

In some examples, the one or more channel conditions is based on a channel capacity of the channel, a spectral efficiency associated with the channel, or both.

In some examples, the compression component 735 may be configured as or otherwise support a means for generating the one or more compressed signals according to a frame rate associated with each wireless device of the set of multiple wireless devices, where each frame rate is based on the compression parameter.

In some examples, the frame rate associated with each wireless device is based on a distortion level associated with generation of the one or more compressed signals, a bit rate associated with generation of a subset of the one or more compressed signals associated with a respective wireless device, or both.

In some examples, to support generating the one or more compressed signals, the compression component 735 may be configured as or otherwise support a means for decreasing a bit rate associated with each wireless device of the set of multiple wireless devices based on increasing the compression parameter.

In some examples, to support generating the one or more compressed signals, the compression component 735 may be configured as or otherwise support a means for increasing a bit rate associated with each wireless device of the set of multiple wireless devices based on decreasing the compression parameter.

In some examples, to support generating the one or more compressed signals, the compression component 735 may be configured as or otherwise support a means for generating a first subset of the one or more compressed signals according to a first frame rate, where the first frame rate is associated with a first wireless device of the set of multiple wireless devices, and where the UE transmits the first subset of the one or more compressed signals to the first wireless device.

In some examples, to support generating the one or more compressed signals, the compression component 735 may be configured as or otherwise support a means for generating a second subset of the one or more compressed signals according to a second frame rate, where the second frame rate is associated with a second wireless device of the set of multiple wireless devices, and where the UE transmits the second subset of the one or more compressed signals to the second wireless device.

In some examples, each wireless device of the set of multiple wireless devices is associated with a frame rate.

In some examples, one or more wireless devices of the set of multiple wireless devices are associated with a same frame rate.

In some examples, one or more wireless devices of the set of multiple wireless devices are associated with different frame rates.

In some examples, to support measuring the one or more channel conditions, the measurement component 730 may be configured as or otherwise support a means for measuring one or more reference signals received via the channel during the first resource reservation period, where the one or more channel conditions are based on the one or more reference signals.

In some examples, the one or more reference signals are measured via a physical layer at the UE.

In some examples, the compression parameter is adapted over a duration of a single frame.

In some examples, the compression parameter is adapted via an application layer of the UE. In some examples, the one or more compressed signals are transmitted via a physical layer of the UE.

Figure 8:
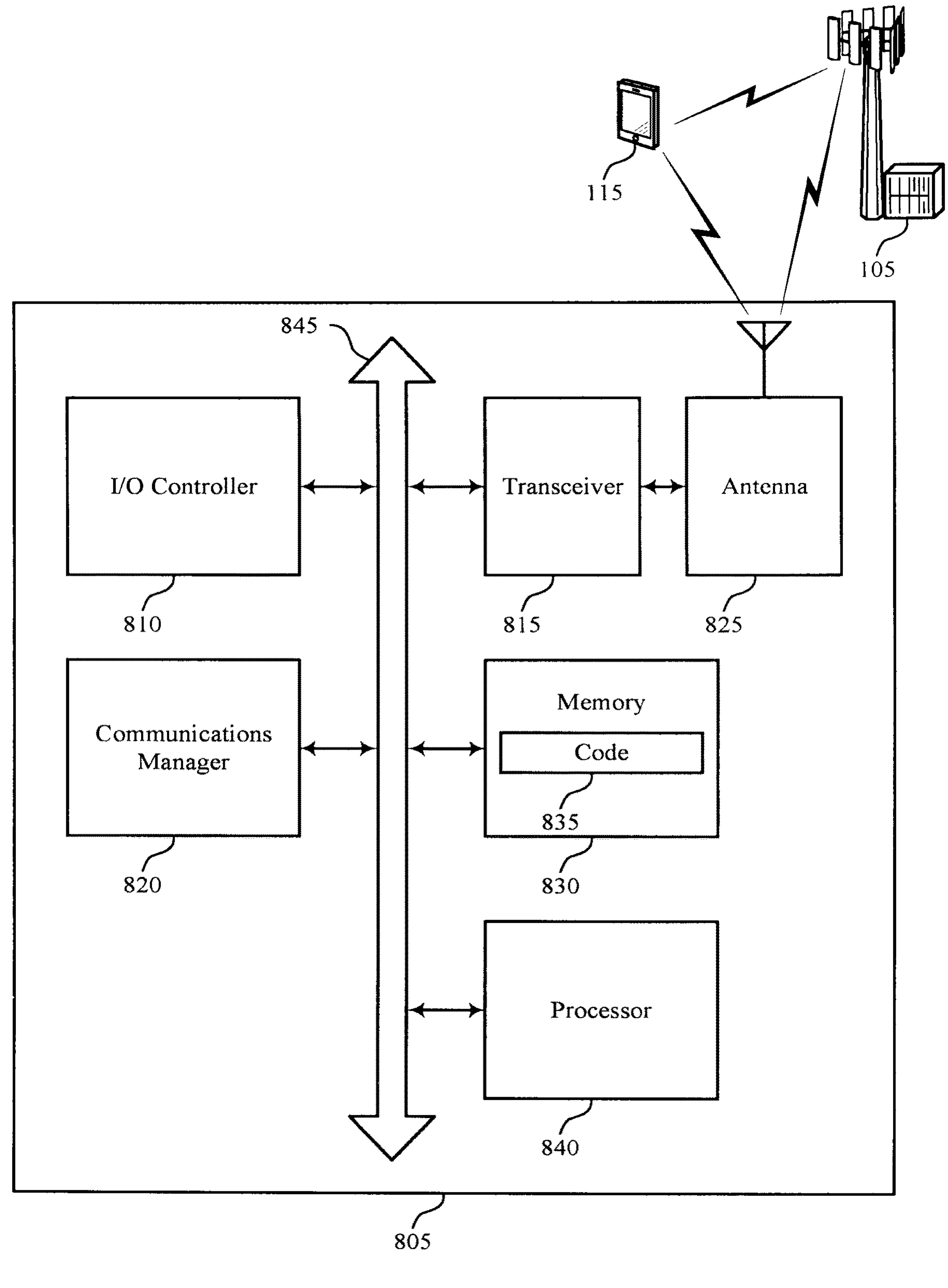
FIG. 8 illustrates a diagram of a system including a device that supports SPS and compression adaptation in accordance with one or more aspects of the present disclosure.

FIG. 8 illustrates a diagram of a system 800 including a device 805 that supports SPS and compression adaptation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting SPS and compression adaptation). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a control message that indicates semi-persistent resources for a set of multiple wireless devices scheduled within a set of resource reservation periods. The communications manager 820 may be configured as or otherwise support a means for measuring one or more channel conditions of a channel during a first resource reservation period of the set of resource reservation periods, the channel associated with the semi-persistent resources for the set of multiple wireless devices. The communications manager 820 may be configured as or otherwise support a means for adapting a compression parameter of one or more signals to be transmitted to the set of multiple wireless devices during the first resource reservation period based on the one or more channel conditions. The communications manager 820 may be configured as or otherwise support a means for transmitting, to the set of multiple wireless devices, one or more compressed signals generated based on the compression parameter and the one or more signals.

By including or configuring the communications manager 820 in accordance with examples as described herein, the device 805 may support techniques for intra-SPS period compression adaption which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of SPS and compression adaptation as described herein, or the processor 840 and the memory 830 may be otherwise configured to perform or support such operations.

Figure 9:
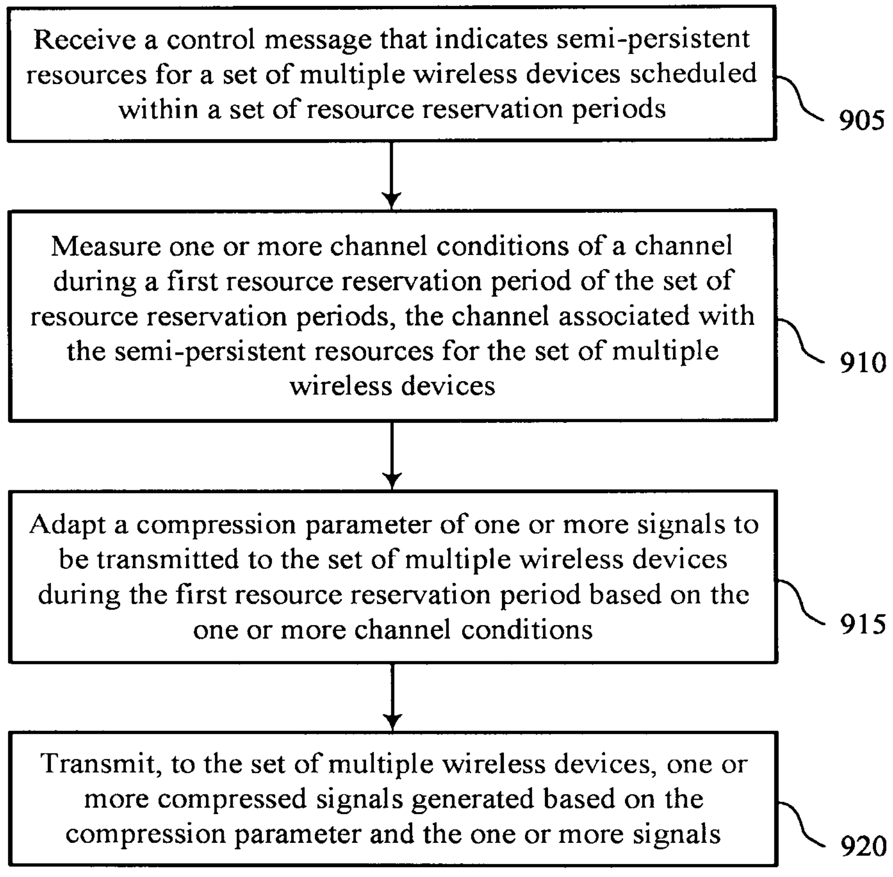
FIGS. 9 through 11 illustrate flowcharts showing methods that support SPS and compression adaptation in accordance with one or more aspects of the present disclosure.

FIG. 9 illustrates a flowchart showing a method 900 that supports SPS and compression adaptation in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving a control message that indicates semi-persistent resources for a set of multiple wireless devices scheduled within a set of resource reservation periods. The operations of 905 may be performed in accordance with examples as disclosed herein. In some examples, aspects of the operations of 905 may be performed by a resource reservation component 725 as described with reference to FIG. 7.

At 910, the method may include measuring one or more channel conditions of a channel during a first resource reservation period of the set of resource reservation periods, the channel associated with the semi-persistent resources for the set of multiple wireless devices. The operations of 910 may be performed in accordance with examples as disclosed herein. In some examples, aspects of the operations of 910 may be performed by a measurement component 730 as described with reference to FIG. 7.

At 915, the method may include adapting a compression parameter of one or more signals to be transmitted to the set of multiple wireless devices during the first resource reservation period based on the one or more channel conditions. The operations of 915 may be performed in accordance with examples as disclosed herein. In some examples, aspects of the operations of 915 may be performed by a compression component 735 as described with reference to FIG. 7.

At 920, the method may include transmitting, to the set of multiple wireless devices, one or more compressed signals generated based on the compression parameter and the one or more signals. The operations of 920 may be performed in accordance with examples as disclosed herein. In some examples, aspects of the operations of 920 may be performed by a compression component 735 as described with reference to FIG. 7.

Figure 10:
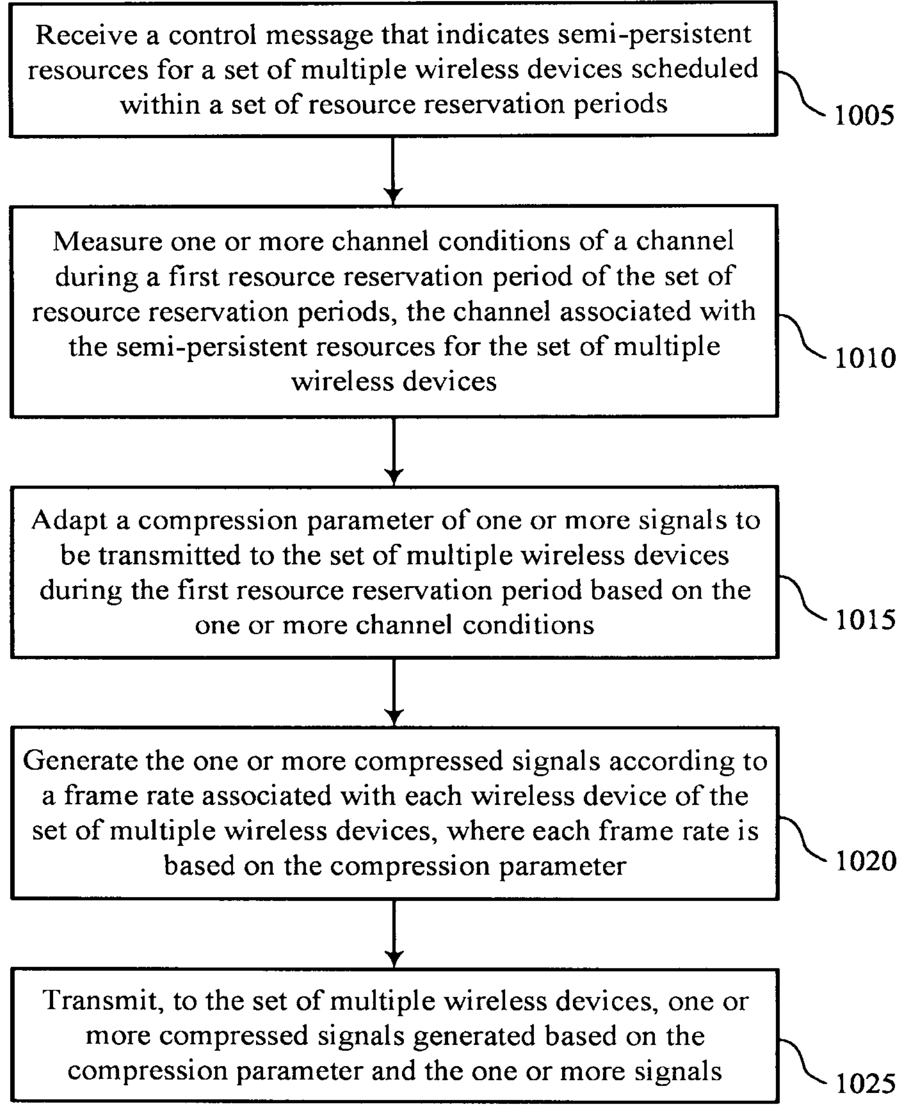

FIG. 10 illustrates a flowchart showing a method 1000 that supports SPS and compression adaptation in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving a control message that indicates semi-persistent resources for a set of multiple wireless devices scheduled within a set of resource reservation periods. The operations of 1005 may be performed in accordance with examples as disclosed herein. In some examples, aspects of the operations of 1005 may be performed by a resource reservation component 725 as described with reference to FIG. 7.

At 1010, the method may include measuring one or more channel conditions of a channel during a first resource reservation period of the set of resource reservation periods, the channel associated with the semi-persistent resources for the set of multiple wireless devices. The operations of 1010 may be performed in accordance with examples as disclosed herein. In some examples, aspects of the operations of 1010 may be performed by a measurement component 730 as described with reference to FIG. 7.

At 1015, the method may include adapting a compression parameter of one or more signals to be transmitted to the set of multiple wireless devices during the first resource reservation period based on the one or more channel conditions. The operations of 1015 may be performed in accordance with examples as disclosed herein. In some examples, aspects of the operations of 1015 may be performed by a compression component 735 as described with reference to FIG. 7.

At 1020, the method may include generating the one or more compressed signals according to a frame rate associated with each wireless device of the set of multiple wireless devices, where each frame rate is based on the compression parameter. The operations of 1020 may be performed in accordance with examples as disclosed herein. In some examples, aspects of the operations of 1020 may be performed by a compression component 735 as described with reference to FIG. 7.

At 1025, the method may include transmitting, to the set of multiple wireless devices, one or more compressed signals generated based on the compression parameter and the one or more signals. The operations of 1025 may be performed in accordance with examples as disclosed herein. In some examples, aspects of the operations of 1025 may be performed by a compression component 735 as described with reference to FIG. 7.

Figure 11:
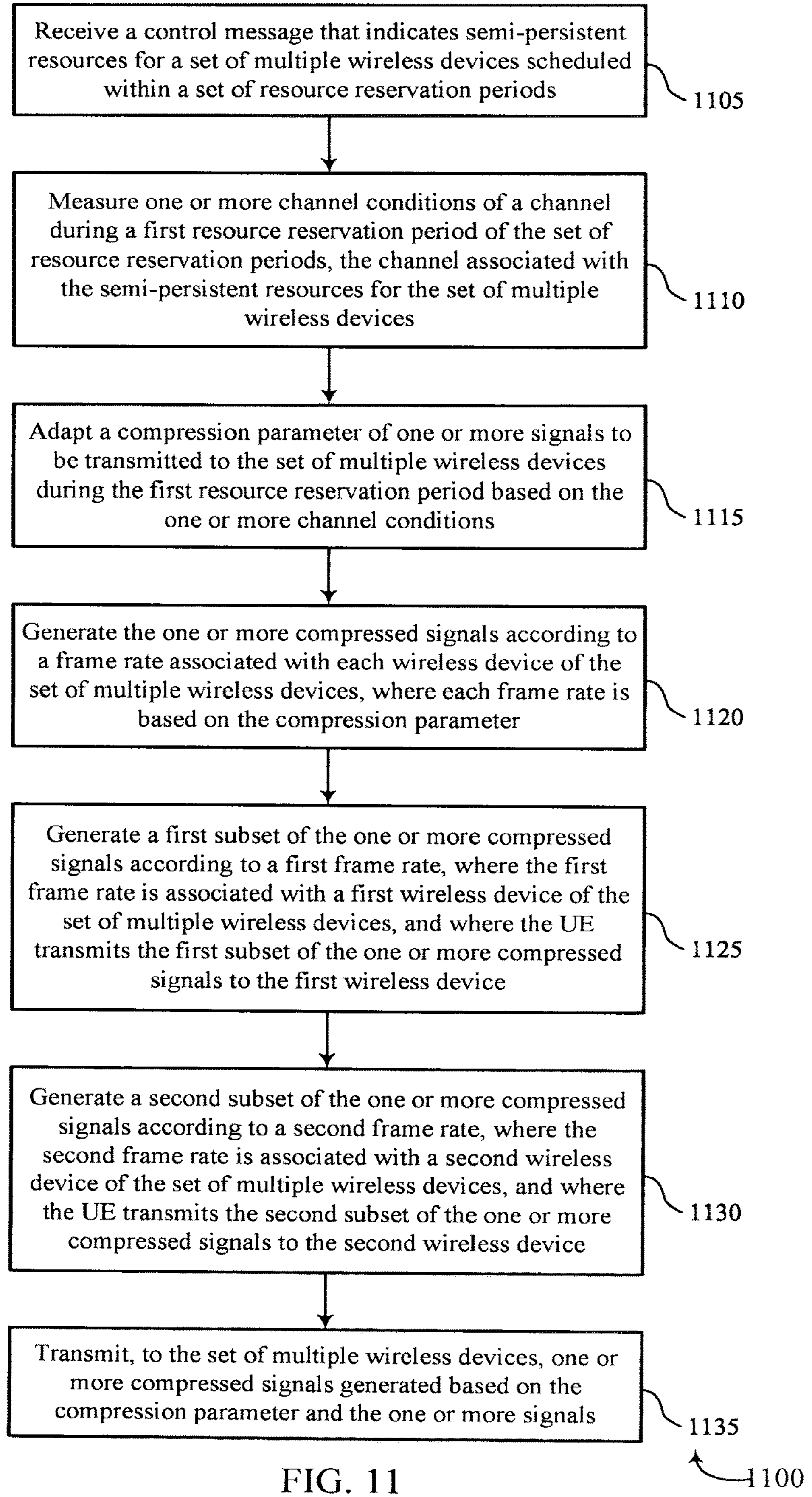

FIG. 11 illustrates a flowchart showing a method 1100 that supports SPS and compression adaptation in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving a control message that indicates semi-persistent resources for a set of multiple wireless devices scheduled within a set of resource reservation periods. The operations of 1105 may be performed in accordance with examples as disclosed herein. In some examples, aspects of the operations of 1105 may be performed by a resource reservation component 725 as described with reference to FIG. 7.

At 1110, the method may include measuring one or more channel conditions of a channel during a first resource reservation period of the set of resource reservation periods, the channel associated with the semi-persistent resources for the set of multiple wireless devices. The operations of 1110 may be performed in accordance with examples as disclosed herein. In some examples, aspects of the operations of 1110 may be performed by a measurement component 730 as described with reference to FIG. 7.

At 1115, the method may include adapting a compression parameter of one or more signals to be transmitted to the set of multiple wireless devices during the first resource reservation period based on the one or more channel conditions. The operations of 1115 may be performed in accordance with examples as disclosed herein. In some examples, aspects of the operations of 1115 may be performed by a compression component 735 as described with reference to FIG. 7.

At 1120, the method may include generating the one or more compressed signals according to a frame rate associated with each wireless device of the set of multiple wireless devices, where each frame rate is based on the compression parameter. The operations of 1120 may be performed in accordance with examples as disclosed herein. In some examples, aspects of the operations of 1120 may be performed by a compression component 735 as described with reference to FIG. 7.

At 1125, the method may include generating a first subset of the one or more compressed signals according to a first frame rate, where the first frame rate is associated with a first wireless device of the set of multiple wireless devices, and where the UE transmits the first subset of the one or more compressed signals to the first wireless device. The operations of 1125 may be performed in accordance with examples as disclosed herein. In some examples, aspects of the operations of 1125 may be performed by a compression component 735 as described with reference to FIG. 7.

At 1130, the method may include generating a second subset of the one or more compressed signals according to a second frame rate, where the second frame rate is associated with a second wireless device of the set of multiple wireless devices, and where the UE transmits the second subset of the one or more compressed signals to the second wireless device. The operations of 1130 may be performed in accordance with examples as disclosed herein. In some examples, aspects of the operations of 1130 may be performed by a compression component 735 as described with reference to FIG. 7.

At 1135, the method may include transmitting, to the set of multiple wireless devices, one or more compressed signals generated based on the compression parameter and the one or more signals. The operations of 1135 may be performed in accordance with examples as disclosed herein. In some examples, aspects of the operations of 1135 may be performed by a compression component 735 as described with reference to FIG. 7.

The following provides an overview of aspects of the present disclosure:

Aspect 1: A method for wireless communications at a UE, comprising: transmitting a control message that indicates SP resources for a plurality of wireless devices scheduled within a set of resource reservation periods; measuring one or more channel conditions of a channel during a first resource reservation period of the set of resource reservation periods, the channel associated with the SP resources for the plurality of wireless devices; adapting a compression parameter of one or more signals to be transmitted to the plurality of wireless devices during the first resource reservation period based at least in part on the one or more channel conditions; and transmitting, to the plurality of wireless devices, one or more compressed signals generated based at least in part on the compression parameter and the one or more signals.

Aspect 2: The method of aspect 1, wherein adapting the compression parameter comprises: increasing the compression parameter based at least in part on a decrease in a channel capacity, a decrease in a spectral efficiency, or both.

Aspect 3: The method of any of aspects 1 through 2, wherein adapting the compression parameter comprises: decreasing the compression parameter based at least in part on an increase in a channel capacity, an increase in a spectral efficiency, or both.

Aspect 4: The method of any of aspects 1 through 3, wherein the one or more channel conditions is based at least in part on a channel capacity of the channel, a spectral efficiency associated with the channel, or both.

Aspect 5: The method of any of aspects 1 through 4, further comprising: generating the one or more compressed signals according to a frame rate associated with each wireless device of the plurality of wireless devices, wherein each frame rate is based at least in part on the compression parameter.

Aspect 6: The method of aspect 5, wherein the frame rate associated with each wireless device is based at least in part on a distortion level associated with generation of the one or more compressed signals, a bit rate associated with generation of a subset of the one or more compressed signals associated with a respective wireless device, or both.

Aspect 7: The method of aspect 6, wherein generating the one or more compressed signals comprises: decreasing a bit rate associated with each wireless device of the plurality of wireless devices based at least in part on increasing the compression parameter.

Aspect 8: The method of any of aspects 6 through 7, wherein generating the one or more compressed signals comprises: increasing a bit rate associated with each wireless device of the plurality of wireless devices based at least in part on decreasing the compression parameter.

Aspect 9: The method of any of aspects 5 through 8, wherein generating the one or more compressed signals comprises: generating a first subset of the one or more compressed signals according to a first frame rate, wherein the first frame rate is associated with a first wireless device of the plurality of wireless devices, and wherein the UE transmits the first subset of the one or more compressed signals to the first wireless device.

Aspect 10: The method of aspect 9, wherein generating the one or more compressed signals comprises: generating a second subset of the one or more compressed signals according to a second frame rate, wherein the second frame rate is associated with a second wireless device of the plurality of wireless devices, and wherein the UE transmits the second subset of the one or more compressed signals to the second wireless device.

Aspect 11: The method of any of aspects 1 through 10, wherein each wireless device of the plurality of wireless devices is associated with a frame rate.

Aspect 12: The method of aspect 11, wherein one or more wireless devices of the plurality of wireless devices are associated with a same frame rate.

Aspect 13: The method of any of aspects 11 through 12, wherein one or more wireless devices of the plurality of wireless devices are associated with different frame rates.

Aspect 14: The method of any of aspects 1 through 13, wherein measuring the one or more channel conditions comprises: measuring one or more reference signals received via the channel during the first resource reservation period, wherein the one or more channel conditions are based at least in part on the one or more reference signals.

Aspect 15: The method of aspect 14, wherein the one or more reference signals are measured via a physical layer at the UE.

Aspect 16: The method of any of aspects 1 through 15, wherein the compression parameter is adapted over a duration of a single frame.

Aspect 17: The method of any of aspects 1 through 16, wherein the compression parameter is adapted via an application layer of the UE, and the one or more compressed signals are transmitted via a physical layer of the UE.

Aspect 18: An apparatus for wireless communications at a UE, comprising a processor; memory coupled with the processor; and instructions stored in the memory and executable by the processor to cause the apparatus to perform a method of any of aspects 1 through 17.

Aspect 19: An apparatus for wireless communications at a UE, comprising at least one means for performing a method of any of aspects 1 through 17.

Aspect 20: A non-transitory computer-readable medium storing code for wireless communications at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
- one or more processors;
- one or more memories coupled with the one or more processors; and
- instructions stored in the one or more memories and executable by the one or more processors to cause the apparatus to:
  - transmit a control message that indicates a plurality of semi-persistent resources for a plurality of wireless devices scheduled within a set of resource reservation periods, each resource reservation period comprising a respective subset of semi-persistent resources from the plurality of semi-persistent resources;
  - measure one or more channel conditions of a channel during a first resource reservation period of the set of resource reservation periods, the channel associated with the plurality of semi-persistent resources for the plurality of wireless devices;
  - adapt, during the first resource reservation period during which the one or more channel conditions are measured, a compression parameter of one or more signals to be transmitted to the plurality of wireless devices via a first subset of semi-persistent resources of the first resource reservation period based at least in part on the one or more channel conditions; and
  - transmit, to the plurality of wireless devices via the first subset of semi-persistent resources of the first resource reservation period, one or more compressed signals generated based at least in part on the compression parameter and the one or more signals.

2. The apparatus of claim 1, wherein the compression parameter comprises a rate at which data in the one or more signals is compressed, and wherein the instructions to adapt the compression parameter are executable by the one or more processors to cause the apparatus to:
- increase the rate at which the data in the one or more signals is compressed based at least in part on a decrease in a channel capacity, a decrease in a spectral efficiency, or both.

3. The apparatus of claim 1, wherein the compression parameter comprises a rate at which data in the one or more signals is compressed, and wherein the instructions to adapt the compression parameter are executable by the one or more processors to cause the apparatus to:
- decrease the rate at which the data in the one or more signals is compressed based at least in part on an increase in a channel capacity, an increase in a spectral efficiency, or both.

4. The apparatus of claim 1, wherein the one or more channel conditions is based at least in part on a channel capacity of the channel, a spectral efficiency associated with the channel, or both.

5. The apparatus of claim 1, wherein the instructions are further executable by the one or more processors to cause the apparatus to:
- generate the one or more compressed signals according to a frame rate associated with each wireless device of the plurality of wireless devices, wherein each frame rate is based at least in part on the compression parameter.

6. The apparatus of claim 5, wherein the frame rate associated with each wireless device is based at least in part on a distortion level associated with generation of the one or more compressed signals, a bit rate associated with generation of a subset of the one or more compressed signals associated with a respective wireless device, or both.

7. The apparatus of claim 6, wherein the instructions to generate the one or more compressed signals are executable by the one or more processors to cause the apparatus to:
- decrease a bit rate associated with each wireless device of the plurality of wireless devices based at least in part on increasing the compression parameter.

8. The apparatus of claim 6, wherein the instructions to generate the one or more compressed signals are executable by the one or more processors to cause the apparatus to:
- increase a bit rate associated with each wireless device of the plurality of wireless devices based at least in part on decreasing the compression parameter.

9. The apparatus of claim 5, wherein the instructions to generate the one or more compressed signals are executable by the one or more processors to cause the apparatus to:
- generate a first subset of the one or more compressed signals according to a first frame rate, wherein the first frame rate is associated with a first wireless device of the plurality of wireless devices, and wherein the UE transmits the first subset of the one or more compressed signals to the first wireless device.

10. The apparatus of claim 9, wherein the instructions to generate the one or more compressed signals are executable by the one or more processors to cause the apparatus to:

generate a second subset of the one or more compressed signals according to a second frame rate, wherein the second frame rate is associated with a second wireless device of the plurality of wireless devices, and wherein the UE transmits the second subset of the one or more compressed signals to the second wireless device.

11. The apparatus of claim 1, wherein each wireless device of the plurality of wireless devices is associated with a frame rate.

12. The apparatus of claim 11, wherein one or more wireless devices of the plurality of wireless devices are associated with a same frame rate.

13. The apparatus of claim 11, wherein one or more wireless devices of the plurality of wireless devices are associated with different frame rates.

14. The apparatus of claim 1, wherein the instructions to measure the one or more channel conditions are executable by the one or more processors to cause the apparatus to:

measure one or more reference signals received via the channel during the first resource reservation period, wherein the one or more channel conditions are based at least in part on the one or more reference signals.

15. The apparatus of claim 14, wherein the one or more reference signals are measured via a physical layer at the UE.

16. The apparatus of claim 1, wherein the compression parameter is adapted over a duration of a single frame.

17. The apparatus of claim 1, wherein the compression parameter is adapted via an application layer of the UE, and wherein the one or more compressed signals are transmitted via a physical layer of the UE.

18. The apparatus of claim 1, wherein the plurality of wireless devices comprises a first wireless device and a second wireless device, wherein the first subset of semi-persistent resources of the first resource reservation period comprise one or more first semi-persistent resources allocated to the first wireless device and one or more second semi-persistent resources allocated to the second wireless device.

19. A method for wireless communications at a user equipment (UE), comprising:

transmitting a control message that indicates a plurality of semi-persistent resources for a plurality of wireless devices scheduled within a set of resource reservation periods, each resource reservation period comprising a respective subset of semi-persistent resources from the plurality of semi-persistent resources;

measuring one or more channel conditions of a channel during a first resource reservation period of the set of resource reservation periods, the channel associated with the plurality of semi-persistent resources for the plurality of wireless devices;

adapting, during the first resource reservation period during which the one or more channel conditions are measured, a compression parameter of one or more signals to be transmitted to the plurality of wireless devices via a first subset of semi-persistent resources of the first resource reservation period based at least in part on the one or more channel conditions; and transmitting, to the plurality of wireless devices via the first subset of semi-persistent resources of the first resource reservation period, one or more compressed signals generated based at least in part on the compression parameter and the one or more signals.

20. The method of claim 19, wherein adapting the compression parameter comprises:

increasing the compression parameter based at least in part on a decrease in a channel capacity, a decrease in a spectral efficiency, or both.

21. The method of claim 19, wherein adapting the compression parameter comprises:

decreasing the compression parameter based at least in part on an increase in a channel capacity, an increase in a spectral efficiency, or both.

22. The method of claim 19, wherein the one or more channel conditions is based at least in part on a channel capacity of the channel, a spectral efficiency associated with the channel, or both.

23. The method of claim 19, further comprising:

generating the one or more compressed signals according to a frame rate associated with each wireless device of the plurality of wireless devices, wherein each frame rate is based at least in part on the compression parameter.

24. The method of claim 23, wherein the frame rate associated with each wireless device is based at least in part on a distortion level associated with generation of the one or more compressed signals, a bit rate associated with generation of a subset of the one or more compressed signals associated with a respective wireless device, or both.

25. The method of claim 23, wherein generating the one or more compressed signals comprises:

generating a first subset of the one or more compressed signals according to a first frame rate, wherein the first frame rate is associated with a first wireless device of the plurality of wireless devices, and wherein the UE transmits the first subset of the one or more compressed signals to the first wireless device.

26. The method of claim 25, wherein generating the one or more compressed signals comprises:

generating a second subset of the one or more compressed signals according to a second frame rate, wherein the second frame rate is associated with a second wireless device of the plurality of wireless devices, and wherein the UE transmits the second subset of the one or more compressed signals to the second wireless device.

27. The method of claim 19, wherein measuring the one or more channel conditions comprises:

measuring one or more reference signals received via the channel during the first resource reservation period, wherein the one or more channel conditions are based at least in part on the one or more reference signals.

28. The method of claim 19, wherein the compression parameter is adapted over a duration of a single frame.

29. An apparatus for wireless communications at a user equipment (UE), comprising:

means for transmitting a control message that indicates a plurality of semi-persistent resources for a plurality of wireless devices scheduled within a set of resource reservation periods, each resource reservation period comprising a respective subset of semi-persistent resources from the plurality of semi-persistent resources;

means for measuring one or more channel conditions of a channel during a first resource reservation period of the set of resource reservation periods, the channel associated with the plurality of semi-persistent resources for the plurality of wireless devices;

means for adapting, during the first resource reservation period during which the one or more channel conditions are measured, a compression parameter of one or more signals to be transmitted to the plurality of wireless devices via a first subset of semi-persistent resources of the first resource reservation period based at least in part on the one or more channel conditions; and means for transmitting, to the plurality of wireless devices via the first subset of semi-persistent resources of the first resource reservation period, one or more compressed signals generated based at least in part on the compression parameter and the one or more signals.

30. A non-transitory computer-readable medium storing code for wireless communications at a user equipment (UE), the code comprising instructions executable by a processor to:

transmit a control message that indicates a plurality of semi-persistent resources for a plurality of wireless devices scheduled within a set of resource reservation periods, each resource reservation period comprising a respective subset of semi-persistent resources from the plurality of semi-persistent resources;

measure one or more channel conditions of a channel during a first resource reservation period of the set of resource reservation periods, the channel associated with the plurality of semi-persistent resources for the plurality of wireless devices;

adapt, during the first resource reservation period during which the one or more channel conditions are measured, a compression parameter of one or more signals to be transmitted to the plurality of wireless devices via a first subset of semi-persistent resources of the first resource reservation period based at least in part on the one or more channel conditions; and transmit, to the plurality of wireless devices via the first subset of semi-persistent resources of the first resource reservation period, one or more compressed signals generated based at least in part on the compression parameter and the one or more signals.

* * * * *